Jan. 1, 1952         E. ACKERLIND         2,580,498
ELECTROOPTICAL PULSE GENERATOR
Filed May 17, 1948

INVENTOR.
ERIK ACKERLIND
BY Herbert E. Metcalf
Attorney

Patented Jan. 1, 1952

2,580,498

UNITED STATES PATENT OFFICE 2,580,498

ELECTROOPTICAL PULSE GENERATOR

Erik Ackerlind, Santa Monica, Calif., assignor to Northrop Aircraft, Inc., Hawthorne, Calif., a corporation of California Application May 17, 1948, Serial No. 27,567

13 Claims. (Cl. 250—230)

1

The present invention relates to an electro-optical pulse generator and more particularly to such a generator that will convert mechanical motion into electrical pulses for various uses as may be desired.

Among the objects of the present invention are:

To provide a simple and efficient means and method of generating electrical pulses.

To provide a means and method of generating electrical pulses proportional to the sine or cosine of an angular motion.

To provide a means and method of utilizing an interferometer in an electrical pulse generating system.

To provide an electro-optical means and method of measuring angular motion, as of a shaft, for example.

To provide an extremely accurate and sensitive means and method of measuring motion in terms of electrical pulses.

And to provide a simple, accurate, and dependable pulse generator.

This invention utilizes certain features of an optical interferometer to generate electrical pulses, which in a preferred form of the invention can represent sines or cosines of an angular movement.

A light interference pattern is obtained by use of an interferometer and projected on a screen which has a mask thereon corresponding to a static condition of the interference pattern in terms of light transmitting and light excluding areas. Light passing through the screen is detected by a photocell or similar converting device. Any change in the length of one of the optical paths in the interferometer will cause movement of the fringe pattern over the mask, resulting in light pulses falling on the photocell to create electrical pulses. As the change in length of one of the light paths can be made a function of the angular motion of a shaft, for example, the number of pulses will represent the sine or cosine of the angle through which the shaft is rotated. As each fringe width in the interference pattern represents half a wave length of light, the system is extremely accurate, and is the equivalent to the use of an enormously extended gear train, without the complications, backlash and other errors of such a gear train. Theoretically, movement of an element in one optical path over a distance of about one wave length of light will cause a detectable light change behind the screen. Practically, the lower limit of sensitivity will depend upon accuracy of mounting and movement of the interferometer elements.

2

The invention can be more readily understood by reference to the drawings in which.

Figure 1:
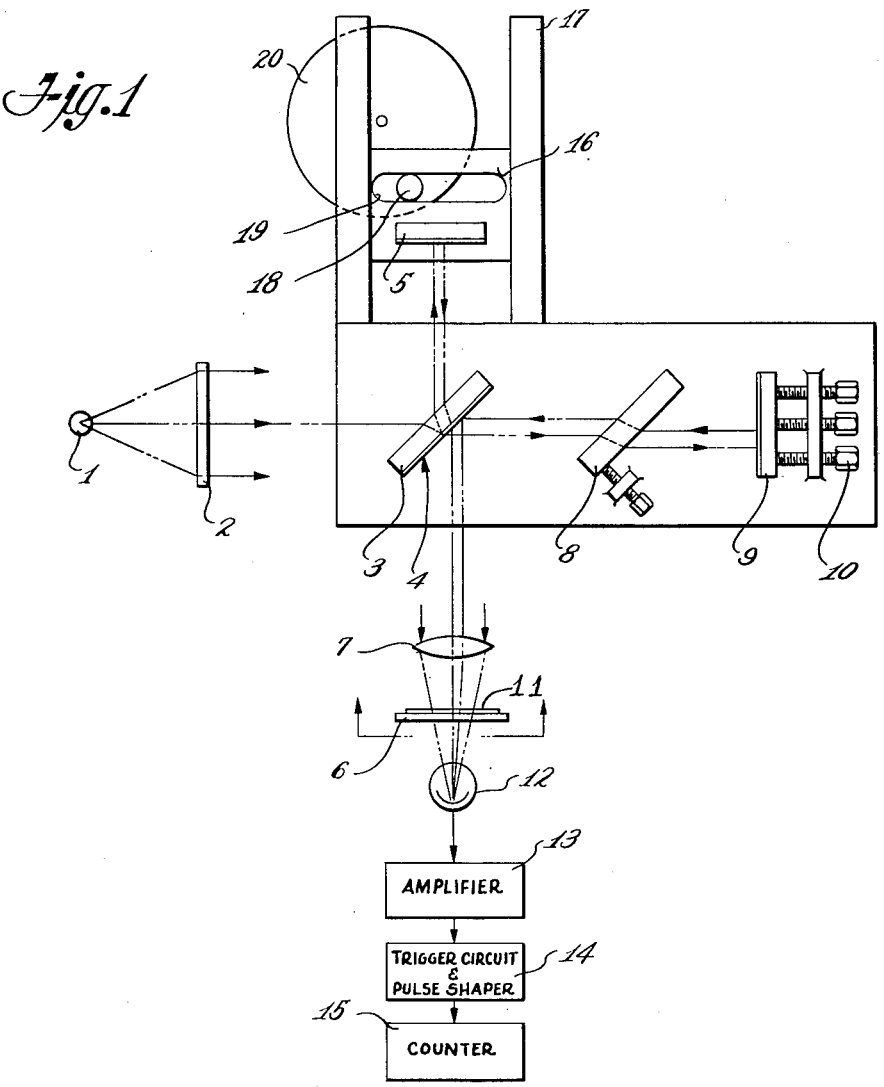
Figure 1 is a diagram showing a preferred electro-optical pulse generator for measuring angular movement in terms of the sine or cosine of the movement.

Referring first to Figure 1, an interferometer, preferably of the Michelson type, is set up, although it is not desired that the present invention be limited to the use of that particular interferometer system, as there are many types. Any type that can provide an interference pattern in which the fringes are movable upon movement of one element therein will be satisfactory.

In the Michelson interferometer shown, light from a monochromatic source 1 is directed to a diffusing screen 2 so that an extended area source of light is obtained. The light then travels to an angularly positioned light splitting plate 3 with plane parallel faces, one of which 4 is slightly silvered. Half of the light is reflected to a movable mirror 5, then back through splitting plate 3 to an image screen 6, through lens 7.

The other half of the light travels through the splitting plate 3, through a plain glass plate 8 parallel to the splitting plate 3, to a stationary mirror 9 adjustable as to angle by adjustment screws 10 to be at a right angle with movable mirror 5.

Light from stationary mirror 9 is reflected back through plain glass plate 8 to the splitting plate 3 and then is reflected by silvered surface 4 on splitting plate 3 onto image screen 6 through lens 7. The plain glass plate 8 is used to make the light following the two optical paths pass through equal amounts of glass.

Light from the center of the optical system shining on the image screen 6 can be made bright or non-existent depending on whether or not the light in the two paths combine at the image screen in a reinforcing or interfering phase relation. Light reflected at an angle does not travel parallel to the optical axis of the system and hence arrives at the image screen to cause areas of interference and areas of reinforcement. The result is an image of concentric light and dark rings on the image screen, each ring corresponding to half a wave length of the light emitted by the source. The image is preferably centrally projected on image screen 6.

Figure 2:
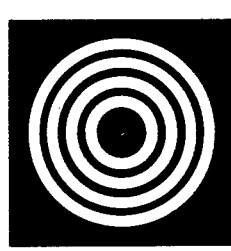
Figure 2 is a diagram showing a mask pattern.

By moving the movable mirror 5 toward or away from the splitting plate 3 one optical path is made longer than the other, and if mirror 5 is at all times maintained perpendicular to stationary mirror 9 during the movement, the concentric fringe rings move outwardly or inwardly on image screen 6 by increasing or decreasing in diameter, without changing the center position. This motion of the interference rings is used to generate electrical pulses as follows:

After the interferometer has been adjusted with the mirrors 5 and 9 brought to perpendicularity, so that stationary concentric rings of light appear on the image screen 6, a mask 11 is prepared and positioned on the screen, this mask being shown in Figure 2, and represents the light and dark rings of the interference image. The mask may be made by photographing the screen, full scale, when the rings are properly positioned thereon, or by making an accurate drawing of the rings, in either case to provide alternate transparent and opaque rings on the mask corresponding to the interference image when stationary. This mask is then mounted on, or substituted for, the image screen 6.

After mask 11 is in place, any movement inwardly or outwardly of the rings in the interference pattern will cause the light portions of the interference pattern to coincide with the transparent portions of the mask to pass light through the mask, or to fall on the opaque portions of the mask so that no light will pass therethrough. Motion of the rings inwardly or outwardly on the mask will cause a series of light pulses to pass through the mask.

These light pulses passing through the mask can be electrically detected by a photocell 12 or similar converter, for example, placed rearwardly of the mask, to create electrical pulses which, when amplified by an amplifier 13 and then passed through a trigger circuit and pulse shaper 14, as is known in the art, can be used to operate a counter 15, such as, for example, a proportional counter as might be used for radio-activity counts.

As the rings in the interference pattern falling on mask 11 can be moved by moving mirror 5, one convenient way of moving this mirror is to mount it on the sliding member 16 of a scotch yoke mechanism 17, this member being moved by a pin 18 carefully fitted in cross slot 19 in sliding member 16. Pin 18 is mounted eccentrically on a shaft or disc 20 whose angular motion it is desired to measure.

As shaft 20 is rotated, the mirror 5 is moved; the length of one optical path is changed; and the interference rings move over the mask creating pulses in the photocell output that are amplified, shaped, and counted. The number of these pulses is proportional to the distance of movement of mirror 5. As the scotch yoke mechanism illustrated will cause the mirror 5 to move a distance proportional to the sine or cosine of the angle through which the shaft or disc 20 is turned, the pulse values counted are values proportional to the sine or cosine of the angle through which the shaft or disc 20 is rotated.

The device described is therefore an extremely accurate and sensitive indicator of shaft angle change and provides an accurate direct measurement of that change.

It should be distinctly understood that the present invention is not limited to the use of concentric type interference patterns or to the use of an entire pattern. All that is required is to have one or more dark areas and one or more light areas in the interference pattern, that are moved by motion of an element in the optical system, with corresponding light transmitting and light excluding areas on the mask or screen traversed by the pattern areas.

While the invention has been described as primarily adapted for use in the measurement of angular motion in terms of electrical pulses, it can equally well be utilized for the measurement of linear motion, depending only on how mirror 5 is linked to the part whose movement is to be measured. Furthermore, due to the extreme motion amplification between that of the mirror and that of the interference fringes, continuous rotation of shaft 20 can provide electrical pulses of very high repetition rates, on the order of kilocycles per second if desired, without exceeding mechanical speed limits of the mechanism.

Many uses of the above described electro-optical pulse generator will suggest themselves to those skilled in the art. However, one preferred use is for the accurate and sensitive detection and/or measurement of movements in guiding devices used for automatic navigation over long ranges, where extreme sensitivity is required to accurately reach a desired destination.

What is claimed is:

1. An electro-optical pulse generator comprising an interferometer having an element movable to change the interference fringe pattern produced by said interferometer, a screen having a plurality of light transmitting and light excluding areas thereon corresponding to the plurality of light and dark areas of said pattern when stationary, the axis of said screen being registered with the axis of said pattern, means for moving said element to move the fringes across the light and dark areas of said screen, and means for electrically detecting the light pulses passing through said screen as said fringes are moved.

2. An electro-optical pulse generator comprising an interferometer having an element movable to change the interference fringe pattern produced by said interferometer, a screen having a plurality of light transmitting and light excluding areas thereon corresponding to the plurality of light and dark areas of said pattern when stationary, the axis of said screen being registered with the axis of said pattern, means for moving said element to move the fringes across the light and dark areas of said screen, a photoelectric converter positioned to receive light passing through said screen, and a pulse counter connected to said photoelectric converter to count the pulses in the output of said photoelectric converter.

3. Apparatus in accordance with claim 2 including a rotatable member, and means connecting said rotatable member with said element for moving said element in the longitudinal direction of its axis.

4. An electro-optical pulse generator comprising a light source, a screen, an optical interferometer positioned to project light from said source onto said screen in the form of an interference pattern having a plurality of alternate light and dark concentric rings, a member in said interferometer movable in space to cause said rings to move inwardly or outwardly in said pattern, a plurality of light transmitting and light excluding areas on said screen corresponding to a static position of said pattern, means for moving said member, and means for converting light pulses passing through said screen into electrical pulses.

5. Apparatus in accordance with claim 4 including a rotatable element, and means connecting said rotatable element with said member for moving said member in the longitudinal direction of its axis.

6. Apparatus in accordance with claim 4 including a rotatable element, means connecting said rotatable element with said member for moving said member in accordance with the sine or cosine of the angle through which said rotatable element is moved, and wherein means are provided to count said pulses as a measure of the sine or cosine of said angle.

7. An electro-optical generator comprising a light source, a screen, an optical interferometer positioned to project light from said source onto said screen in the form of an interference pattern having a plurality of alternate light and dark concentric rings, a member in said interferometer movable in space to cause said rings to move inwardly or outwardly in said pattern, a plurality of light transmitting and light excluding areas on said screen corresponding to a static position of said pattern, a rotatable element, a yoke attached to said member and slidably connected to said rotatable element, whereby said member is moved along the light path through said interferometer by said rotatable element to move the rings of said interference pattern radially.

8. An electro-optical generator comprising a light source, a screen, an optical interferometer positioned to project light from said source onto said screen in the form of an interference pattern having a plurality of alternate light and dark concentric rings, a member in said interferometer movable in space to cause said rings to move inwardly or outwardly in said pattern, a plurality of light transmitting and light excluding areas on said screen corresponding to a static position of said pattern, a rotatable element, a yoke attached to said member and slidably connected to said rotatable element, whereby said member is moved along the light path through said interferometer by said rotatable element to move the rings of said interference pattern radially and means for sensing light variations back of said screen due to said ring movement.

9. The method of accurately measuring movements of a body which comprises forming a light interference fringe pattern having alternate light and dark areas by transmitting light simultaneously over two interfering paths, changing the length of one of said paths in accordance with a movement of said body to create movement of a plurality of fringes of said pattern over a stationary light transmitting area having a spatial extent in the direction of movement of said fringes on the order of the width of one of said areas in said pattern, electrically sensing changes in light intensity over said light transmitting area as the light and dark areas of said fringe pattern move thereover to create electrical pulses, and counting said pulses as a measure of the movement of said body.

10. The method of accurately measuring angular rotations of a body which comprises forming a light interference fringe pattern having alternate light and dark areas by transmitting light simultaneously over two interfering paths, changing the length of one of said paths in accordance with an angular rotation of said body to create movement of a plurality of fringes of said pattern over a stationary light transmitting area having a spatial extent in the direction of movement of said fringes on the order of the width of one of said areas in said pattern, electrically sensing changes in light intensity over said light transmitting area as said light and dark areas move thereover to create electrical pulses, and counting said pulses as a measure of said angular rotation.

11. The method of generating a train of electrical pulses which comprises forming a light interference fringe pattern having alternate light and dark areas by transmitting light simultaneously over two interfering paths, changing the length of one of said paths to create movement of a plurality of fringes of said pattern over a stationary light transmitting area having a spatial extent in the direction of movement of said fringes on the order of the width of one of said areas in said pattern, and electrically sensing the changes in light intensity over said light transmitting area as said plurality of fringes move thereover to create a corresponding plurality of electrical pulses.

12. The method of generating a high frequency continuous train of electrical pulses which comprises forming a light interference fringe pattern having alternate light and dark areas by transmitting light simultaneously over two interfering paths, continuously changing the length of one of said paths to create movement of the fringes of said pattern over a stationary light transmitting area having a spatial extent in the direction of movement of said fringes on the order of the width of one of said areas in said pattern, and electrically sensing changes in light intensity over said light transmitting area as said light and dark areas move thereover to create said continuous train of electrical pulses.

13. The method of generating a train of electrical pulses which comprises transmitting light simultaneously over two interfering paths to form an interference fringe pattern having a plurality of concentric, circular, and alternate light and dark areas, changing the length of one of said paths to cause radial movement of the light and dark areas of said fringe pattern over a screening area having concentric, circular and alternate light transmitting and light excluding portions corresponding to light and dark areas of said fringe pattern when said fringe pattern is stationary, and sensing the changes in light intensity over the light transmitting portions of said screening area as a train of electrical pulses.

ERIK ACKERLIND.

REFERENCES CITED

The following references are of record in the file of this patent:

UNITED STATES PATENTS

| Number | Name | Date |
|---|---|---|
| 908,725 | Ashley | Jan. 5, 1909 |
| 1,709,762 | Zworykin | Apr. 16, 1929 |
| 1,709,809 | Rashevsky | Apr. 16, 1929 |
| 1,951,523 | Nicolson | Mar. 20, 1934 |
| 1,962,208 | Nicolson | June 12, 1934 |
| 2,142,378 | Sachtleben | Jan. 3, 1939 |
| 2,312,888 | Everest | Mar. 2, 1943 |
| 2,410,502 | Hurley | Nov. 5, 1946 |
| 2,418,786 | Nadiz et al. | Apr. 8, 1947 |

FOREIGN PATENTS

| Number | Country | Date |
|---|---|---|
| 509,310 | Germany | Oct. 8, 1930 |